(12) United States Patent
Ozaki et al.

(10) Patent No.: US 6,910,343 B2
(45) Date of Patent: Jun. 28, 2005

(54) VAPOR-COMPRESSION REFRIGERANT CYCLE WITH EJECTOR

(75) Inventors: Yukikatsu Ozaki, Gamagori (JP); Hirotsugu Takeuchi, Nagoya (JP)

(73) Assignees: Nippon Soken, Inc., Nishio (JP); DENSO Corporation, Kariya (JP)

( * ) Notice: Subject to any disclaimer, the term of this patent is extended or adjusted under 35 U.S.C. 154(b) by 0 days.

(21) Appl. No.: 10/819,240

(22) Filed: Apr. 6, 2004

(65) Prior Publication Data

US 2004/0211199 A1 Oct. 28, 2004

(30) Foreign Application Priority Data

Apr. 23, 2003 (JP) ........................................ 2003-118119

(51) Int. Cl.$^7$ ................................................ F25B 1/06
(52) U.S. Cl. ............................. 62/191; 62/500; 417/77; 417/185; 417/191; 417/192
(58) Field of Search ........................ 62/191, 170, 197, 62/278, 116, 500; 417/77, 79, 185, 190, 191, 192

(56) References Cited

U.S. PATENT DOCUMENTS

| | | | | | |
|---|---|---|---|---|---|
| 4,261,708 | A | * | 4/1981 | Gallagher ..................... | 95/270 |
| 5,343,711 | A | * | 9/1994 | Kornhauser et al. .......... | 62/511 |
| 6,438,993 | B2 | * | 8/2002 | Takeuchi et al. .............. | 62/500 |
| 6,477,857 | B2 | * | 11/2002 | Takeuchi et al. .............. | 62/500 |
| 6,574,987 | B2 | * | 6/2003 | Takeuchi et al. .............. | 62/500 |
| 6,584,794 | B2 | * | 7/2003 | Takeuchi et al. .............. | 62/278 |
| 6,606,873 | B2 | * | 8/2003 | Takeuchi ...................... | 62/191 |
| 6,675,609 | B2 | * | 1/2004 | Takeuchi et al. .............. | 62/500 |
| 6,706,438 | B2 | * | 3/2004 | Sahoda et al. ................ | 429/34 |
| 6,729,149 | B2 | * | 5/2004 | Takeuchi ...................... | 62/191 |
| 6,729,158 | B2 | * | 5/2004 | Sakai et al. ................... | 62/500 |
| 6,742,356 | B2 | * | 6/2004 | Saito et al. .................... | 62/500 |

FOREIGN PATENT DOCUMENTS

| | | |
|---|---|---|
| JP | 5-312421 | 11/1993 |
| JP | 405312421 A | * 11/1993 |
| JP | 410205898 A | * 8/1998 |

* cited by examiner

Primary Examiner—William Tapolcai
Assistant Examiner—Mohammad M. Ali
(74) Attorney, Agent, or Firm—Harness, Dickey & Pierce, PLC

(57) ABSTRACT

In an ejector cycle having an ejector, a decompression amount of refrigerant between a gas-liquid separator and an evaporator is adjusted by a differential pressure control valve, so that a pressure increasing amount in a pressure increasing portion of the ejector is controlled to be equal to or lower than a predetermined amount. Therefore, a suction pressure of refrigerant to be sucked to the compressor can be restricted from being excessively increased in accordance with the increase of the pressure increasing amount in the ejector, and it can prevent heat radiating capacity of a radiator from being decreased. Thus, a sufficient cooling capacity can be always obtained in the ejector cycle.

15 Claims, 11 Drawing Sheets

FIG. 13 <u>RELATED ART</u>

VAPOR-COMPRESSION REFRIGERANT CYCLE WITH EJECTOR

CROSS-REFERENCE TO RELATED APPLICATION

This application is related to and claims priority from Japanese Patent Application No. 2003-118119 filed on Apr. 23, 2003, the contents of which are hereby incorporated by reference.

FIELD OF THE INVENTION

The present invention relates to a vapor-compression refrigerant cycle (ejector cycle) having an ejector, which can effectively used for a vehicle air conditioner.

BACKGROUND OF THE INVENTION

In an ejector cycle shown in FIG. 13, refrigerant flows in this order of a compressor 110→a radiator 120, a nozzle of an ejector 140→a gas-liquid separator 150→the compressor 110. At the same time, refrigerant also flows by an entrainment function of a high-speed drive flow of the refrigerant jetted from the nozzle of the ejector 140, in this order of gas-liquid separator 150→a throttle 161→an evaporator 130→a pressure increasing portion of the ejector 140→the gas-liquid separator 150.

FIG. 14 shows drive flow states in the ejector cycle in FIG. 13 when carbon dioxide is used as the refrigerant. In FIG. 14, P1–P6 indicate refrigerant states at the same positions shown in FIG. 13. Further, the solid line state P1–P6 in FIG. 14 shows a state where a thermal load in the evaporator 130 is larger than the chain-line state P1–P6. Generally, when a pressure loss in a refrigerant passage connecting the evaporator 130 and the ejector 140 is not considered, a pressure in the evaporator 130 is approximately equal to a pressure at the position P3 in the ejector 140.

In a cool-down operation in summer, an outside air temperature is high, and a thermal load (air-conditioning load) of the evaporator 130 is high. In this case, because the outside air temperature for cooling refrigerant in the radiator 120 is high, an enthalpy different in a decompression of the nozzle of the ejector 140 becomes larger, and a pressure increasing amount in a pressure increasing portion of the ejector 140 becomes larger (P4→P5). Thus, the pressure of refrigerant in the gas-liquid separator 150 is increased to a pressure (P6) near the critical pressure of the refrigerant as shown in FIG. 14. Accordingly, as shown in FIG. 14, the pressure of refrigerant to be sucked into the compressor 100 is increased, and the specific enthalpy of the refrigerant flowing into the radiator 120 becomes smaller. Further, because the outside air temperature is high, the refrigerant flowing into the radiator 120 is not sufficiently cooled, and the heat-radiating capacity of the radiator 120 is decreased.

Further, when the pressure of refrigerant flowing into the nozzle of the ejector 140 is higher than the critical pressure as shown in FIG. 14, a pressure increasing amount in the pressure increasing portion of the ejector 140 becomes greatly larger, as compared with a case where the pressure of the refrigerant flowing into the nozzle of the ejector is lower than the critical pressure. Thus, in a super-critical refrigerant cycle where the pressure of refrigerant flowing into the nozzle is higher than the critical pressure, when the outside air temperature is high and the pressure in the evaporator 30 is high in the cool-down operation (rapid cooling operation), the heat radiating capacity of the radiator 120 may be greatly reduced.

SUMMARY OF THE INVENTION

In view of the above-described problems, it is an object of the present invention to provide a vapor-compression refrigerant cycle having an ejector, which can effectively prevent heat-radiating capacity of a radiator from being greatly reduced.

According to the present invention, a vapor-compression refrigerant cycle includes a compressor for discharging a high-pressure refrigerant, a high-pressure heat exchanger for radiating heat of the high-pressure refrigerant discharged from the compressor, a low-pressure heat exchanger in which a low-pressure refrigerant after being decompressed is evaporated, an ejector and a gas-liquid separator for separating the refrigerant flowing out of the ejector into liquid refrigerant and gas refrigerant. The ejector includes a nozzle for decompressing and expanding the high-pressure refrigerant flowing out of the high-pressure heat exchanger, and a pressure increasing portion in which gas refrigerant evaporated in the low-pressure heat exchanger is drawn by a high-speed flow of refrigerant jetted from the nozzle and a pressure of refrigerant to be sucked into the compressor is increased by converting expansion energy of the refrigerant to pressure energy thereof. The vapor-compression refrigerant cycle further includes a decompression means for decompressing refrigerant supplied from the gas-liquid separator to the low-pressure heat exchanger, and a pressure-increasing amount control means for controlling a pressure increasing amount of refrigerant in the pressure increasing portion of the ejector. Therefore, it can restrict the pressure of refrigerant to be sucked to the compressor from being greatly increased due to the pressure increasing amount in the pressure increasing portion of the ejector. Thus, the pressure increasing amount in the pressure increasing portion of the ejector can be controlled in accordance with the thermal load of the low-pressure heat exchanger, and heat-radiating capacity of the high-pressure heat exchanger can be reduced.

Alternatively, the vapor-compression refrigerant cycle includes a pressure-increasing amount control device which decompresses refrigerant supplied from the gas-liquid separator to the low-pressure heat exchanger and controls a pressure increase amount of refrigerant in the pressure increasing portion of the ejector. Therefore, the pressure increasing amount in the pressure increasing portion of the ejector can be restricted, and the heat radiating capacity of the radiator can be improved. Thus, even when the vapor-compression refrigerant cycle is used for a super-critical refrigerant cycle in a high outside air temperature, the heat radiating capacity of the radiator can be sufficiently improved.

Preferably, the pressure-increasing amount control device is disposed in a refrigerant passage between the liquid refrigerant outlet of the gas-liquid separator and the refrigerant inlet side of the low-pressure heat exchanger. For example, the pressure-increasing amount control device includes a throttle portion which decompresses refrigerant supplied from the gas-liquid separator to the low-pressure heat exchanger, a bypass passage through which refrigerant is supplied from the gas-liquid separator to the low-pressure heat exchanger while bypassing the throttle portion, and a valve device which adjusts an open degree of the bypass passage. In this case, for example, the valve device is a differential pressure regulating valve which is opened when a pressure difference before and after the valve device is larger than a predetermined value. Further, the throttle portion, the bypass passage and the valve device can be integrated.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

In the first embodiment, an ejector cycle (vapor-compression refrigerant cycle) according to the present invention is typically used for a vehicle air conditioner.

Figure 1:
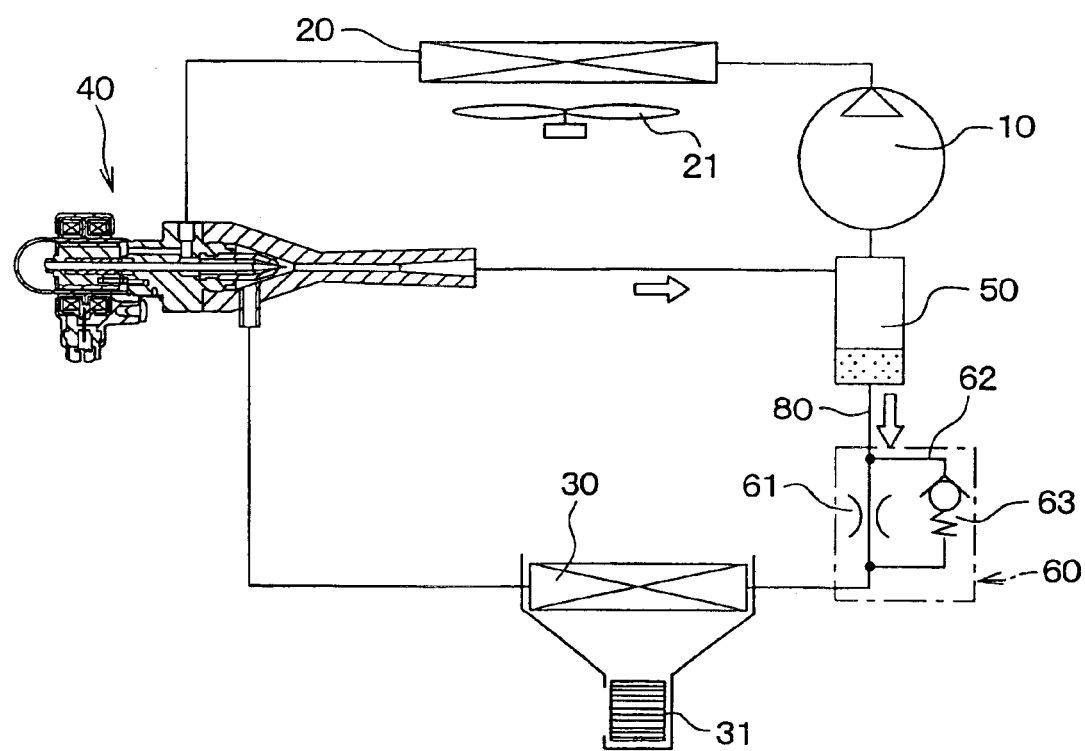
FIG. 1 is a schematic diagram showing an ejector cycle (vapor-compression refrigerant cycle) according to a first embodiment of the present invention.

In FIG. 1, a compressor 10 is a variable displacement compressor for sucking and compressing refrigerant circulated in the ejector cycle. The compressor 10 is driven by power from a vehicle engine for a vehicle running. A discharge capacity of the compressor 10 is controlled so that a temperature or a pressure in an evaporator 30 becomes in a predetermined range. An electrical compressor can be used as the variable displacement compressor 10. In this case, a refrigerant amount discharged from the compressor 10 can be controlled by controlling a rotational speed.

A radiator 20 is a high-pressure heat exchanger for cooling high-temperature and high-pressure refrigerant discharged from the compressor 10 by performing heat-exchange operation between outside air and the high-temperature and high-pressure refrigerant. Further, the evaporator 30 is a low-pressure heat exchanger for cooling air to be blown into a compartment by evaporating liquid refrigerant, more specifically, by performing heat-exchange operation between the air and low-pressure refrigerant.

In the first embodiment, carbon dioxide is used as the refrigerant, and the pressure of refrigerant discharged from the compressor 10 is made equal to or higher than the critical pressure of the refrigerant. Therefore, refrigerant cools in the radiator 20 without a condensation (phase change). Therefore, the enthalpy of the refrigerant decreases in the radiator 20 by decreasing the temperature of the refrigerant in the radiator 20. However, freon (HFC134$a$) can be used as the refrigerant. When the pressure of refrigerant discharged from the compressor 10 is lower than the critical pressure, the enthalpy of the refrigerant decreases in the radiator 2 while the refrigerant condenses in the radiator 20.

An ejector 40 sucks refrigerant evaporated in the evaporator 30 while decompressing and expanding refrigerant flowing out of the radiator 20 in a nozzle 41, and increases pressure of refrigerant to be sucked into the compressor 10 by converting expansion energy of the refrigerant to pressure energy of the refrigerant.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. A gas refrigerant outlet of the gas-liquid separator 50 is connected to a suction side of the compressor 10, and a liquid refrigerant outlet of the gas-liquid separator 50 is connected to a refrigerant inlet side of the evaporator 30.

A throttle portion 61 is provided in a refrigerant passage 80 through which liquid refrigerant in the gas-liquid separator 50 is supplied to the evaporator 30. The throttle portion 61 is a decompression device (decompression means) for decompressing liquid refrigerant supplied from the gas-liquid separator 50 to the evaporator 30. In the first embodiment, the throttle portion 61 is a fixed throttle having a fixed opening degree, such as a capillary tube and an orifice.

A bypass passage 62, through which liquid refrigerant in the gas-liquid separator 50 is supplied to the evaporator 30 while bypassing the throttle portion 61, is provided in the ejector cycle. Further, a differential pressure regulating valve 63 is provided in the bypass passage 62 to adjust an opening degree of the bypass passage 62. The differential pressure regulating valve 63 opens when a pressure difference before and after the valve becomes equal to or larger than a predetermined pressure difference. The structure of the differential pressure regulating valve 63 will be described later in detail.

Figure 2:
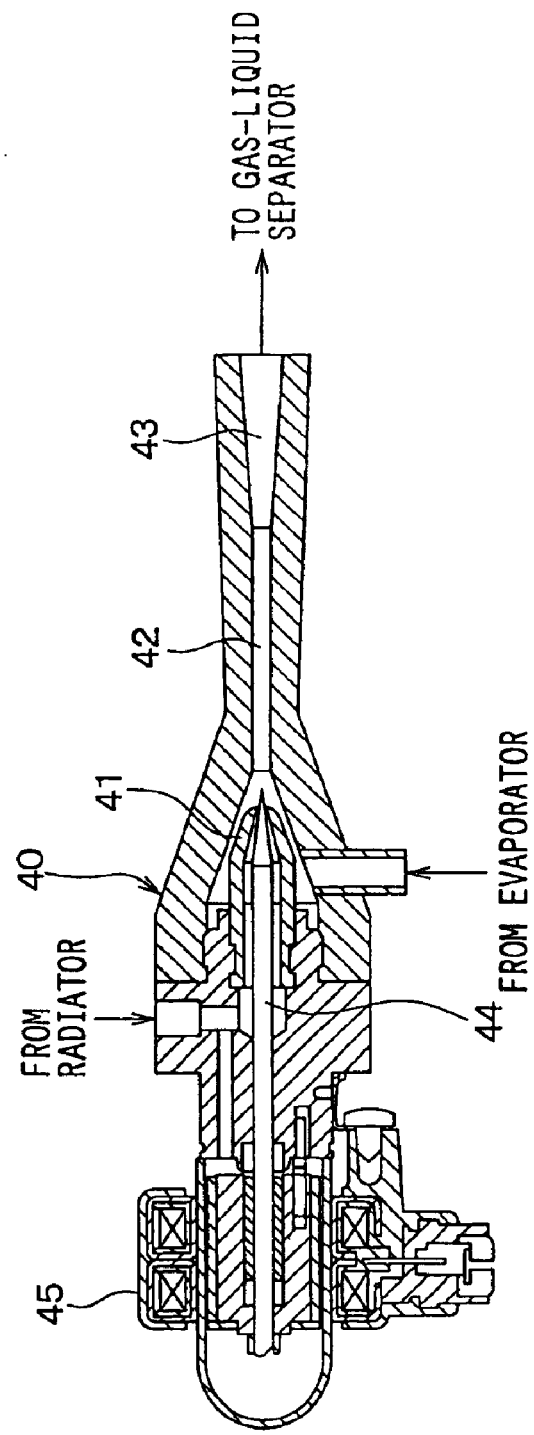
FIG. 2 is a schematic sectional view showing an ejector used for the ejector cycle in the first embodiment.

Next, the ejector 40 will be now described with reference to FIG. 2. As shown in FIG. 2, the ejector 40 includes the nozzle 41, a mixing portion 42, and a diffuser 43. The nozzle 41 decompresses and expands high-pressure refrigerant flowing into the ejector 40 in isentropic by converting the pressure energy of the high-pressure refrigerant from the radiator 20 to the speed energy thereof. The mixing portion 42 sucks gas refrigerant evaporated in the evaporator 30 by using an entrainment function of high-speed refrigerant stream injected from the nozzle 41, while mixing the sucked refrigerant and the jetted refrigerant therein. Further, the diffuser 43 mixes the refrigerant jetted from the nozzle 41 and the refrigerant sucked from the evaporator 30, and increases the refrigerant pressure by converting the speed energy of the mixed refrigerant to the pressure energy thereof.

Further, the ejector 40 includes a needle 44 for variably controlling a throttle opening degree of the nozzle 41, and an actuator 45 for displacing the needle 44 in an axial direction. In the first embodiment, a stepping motor is used as the actuator 45, and the needle 44 is displaced in the axial direction of the nozzle 41 in proportion to a rotation angle of the stepping motor.

In the mixing portion 42, a drive stream of refrigerant from the nozzle 41 and a suction stream of the refrigerant from the evaporator 30 are mixed so that their momentum sum is conserved, thereby increasing refrigerant pressure as in the diffuser 43. In the diffuser 43, because a refrigerant passage sectional area gradually increases toward its outlet, the refrigerant speed energy (dynamic pressure) is converted to refrigerant pressure energy (static pressure). Thus, in the ejector 40, the refrigerant pressure is increased by both of the mixing portion 42 and the diffuser 43. Accordingly, in the ejector 40, a pressure increasing portion is constructed with the mixing portion 42 and the diffuser 43.

Next, the structure of the differential pressure regulating valve 63 will be now described with reference to FIGS. 3A and 3B. The differential pressure regulating valve 63 includes a housing 63a made of a metal such as a stainless and a brass. The housing 63a has an inlet port 63b communicating with a refrigerant outlet side of the gas-liquid separator 50, and an outlet port 63c communicating with the refrigerant inlet side of the evaporator 30. A valve port 63f is provided in the housing 63a to communicate with a first space 63d and a second space 63e. Here, the first space 63d communicates with the inlet port 63b, and the second space 63e communicates with the outlet port 63c.

Further, a valve body 63g is disposed in the second space 63e to adjust the opening degree of the valve port 63f. The valve body 63g is pressed by a spring force of a metal coil spring 63h (elastic member) toward the side of the first space 63d communicated with the inlet port 63b.

The housing 63a is constructed with a lid portion 63i having the outlet port 63c, a bottom portion where the inlet port 63b is formed, and a cylindrical body portion 63k. In the first embodiment, the bottom portion 63j having the inlet port 63b and the body portion 63k are integrally formed to form an integrated body. After the valve body 63g and the coil spring 63h are received in the integrated body of the housing 63a, the lid portion 63i is connected to the integrated body of the housing 63a by a connecting means such as a welding and a screw connection, so that the differential pressure regulating valve 63 is formed.

A guide skirt 63m guides a movement of the valve body 63g in the housing 63a. A cylindrical outer surface 63a of the guide skirt 63m contacts an inner wall surface of the housing 63a so that the movement of the valve body 63g is guided. Plural holes 63p for forming refrigerant passages are provided in the guide skirt 63m at positions proximate to the valve body 63g.

Figure 3A:
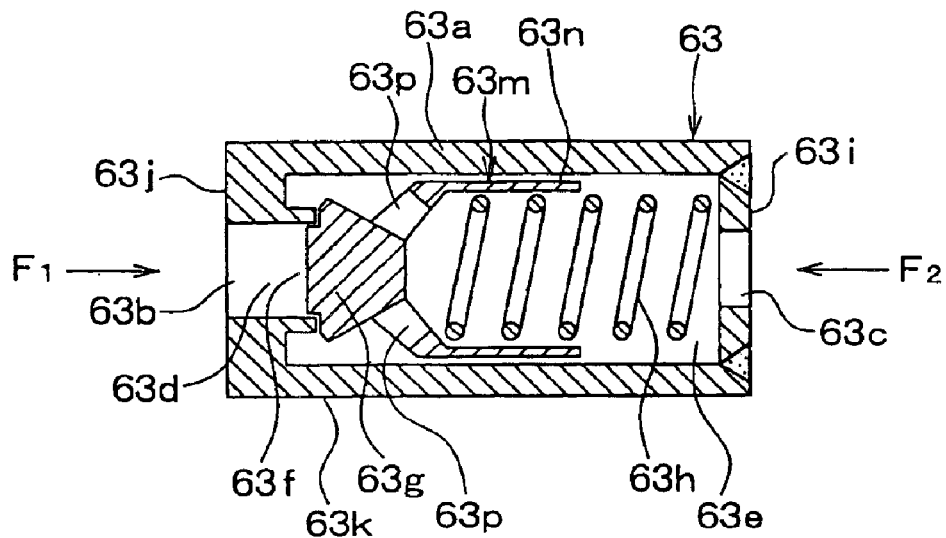
FIG. 3A is a schematic sectional view showing a differential pressure regulating valve in a valve closing operation according to the first embodiment.
Figure 3B:
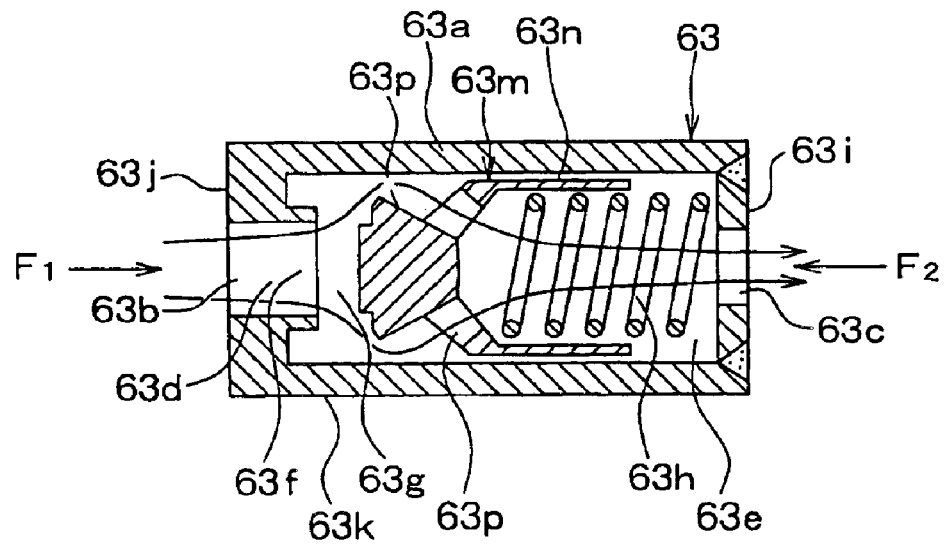
FIG. 3B is a schematic sectional view showing the differential pressure regulating valve in a valve opening operation according to the first embodiment.

As shown in FIGS. 3A and 3B, an action force F1 due to a pressure at a side of the gas-liquid separator 50 is applied to the valve body 63g from the inlet port 63b, so that the valve body 63g is pressed toward the outlet port 63c by the action force F1. In contrast, an action force F2, due to a pressure at the refrigerant inlet side of the evaporator 30 and an elastic force of the coil spring 63h, is applied to the valve body 63g from the outlet port 63c, so that the valve body 63g is pressed toward the inlet port 63b by the action force F2.

Thus, when the action force F2 is larger than the action force F1, the valve body 63g is moved so than an opening degree of the valve port 63f becomes smaller. In contrast, when the action force F1 is larger than the action force F2, the valve body 63g is moved so than an opening degree of the valve port 63f becomes larger. FIG. 3A shows a state where the valve port 63f is closed by the valve body 63g, and FIG. 3B shows a state where the valve port 63f is opened.

The valve body 63g moves and stops at a position where the action force F1 and the action force F2 are balanced. Therefore, the opening degree of the valve port 63f is determined by the elastic force of the coil spring 63h applied to the valve body 63g. That is, a pressure difference $\Delta P$ between the first and second spaces 63d, 63e corresponds to the elastic force of the coil spring 63h applied to the valve body 63g. Further, because a moving amount (lift amount) of the valve body 63g is a little, a change of the elastic force of the coil spring 63h applied to the valve body 63g can be nearly unconsidered. In this case, the pressure difference $\Delta P$ between the two spaces 63d, 63e becomes nearly constant.

Next, operation of the ejector cycle according to the first embodiment will be described. Gas refrigerant is sucked from the gas-liquid separator 50 into the compressor 10, and is compressed in the compressor 10. Refrigerant discharged from the compressor 10 flows into the radiator 20 to be cooled. Refrigerant cooled in the radiator 20 is decompressed and expanded in iso-entropy in the nozzle 41 of the ejector 40, and is jetted from the nozzle 41 into the mixing portion 42 by a speed larger than a sound speed.

When the compressor 10 operates, refrigerant in the evaporator 30 is sucked into the mixing portion 42 of the ejector 40 by pumping operation due to the entrainment function of the refrigerant flow jetted from the nozzle 41. Because the refrigerant evaporated in the evaporator 30 is drawn into the mixing portion 42 of the ejector 40, low-pressure side refrigerant is circulated in this order of the gas-liquid separator 50→the throttle portion 61→the evaporator 30→the pressure increasing portion of the ejector 40→the gas-liquid separator 50.

Further, the refrigerant sucked from the evaporator 30 and the refrigerant jetted from the nozzle 41 are mixed in the mixing portion 42, and the dynamic pressure of the mixed refrigerant is converted to the static pressure thereof in the diffuser 43. The mixed refrigerant mixed in the mixing portion 42 flows into the diffuser 43, and the refrigerant pressure is further increased in the diffuser 43 while the flow speed of the refrigerant is decreased. Then, refrigerant discharged from the outlet of the diffuser 43 of the ejector 40 flows into the gas-liquid separator 50. The refrigerant flowing into the evaporator 30 is circulated by the pumping operation of the ejector 40. Therefore, the pressure increasing amount in the pressure increasing portion of the ejector 40 is equal to a pressure loss in a refrigerant passage from the pressure increasing portion of the ejector 40 to the ejector 40 through the gas-liquid separator 50 and the evaporator 30. At this time, a pressure loss in a refrigerant pipe connecting the ejector 40 and the gas-liquid separator 50, a pressure loss in the evaporator 30 and a pressure loss in a refrigerant pipe connecting the evaporator 30 and the ejector 40 are greatly smaller than a pressure loss in the throttle portion 61. Thus, the pressure increasing amount in the pressure increasing portion of the ejector 40 is determined approximately by the pressure loss generated in the throttle portion 61 and the differential pressure regulating valve 63.

Figure 4:
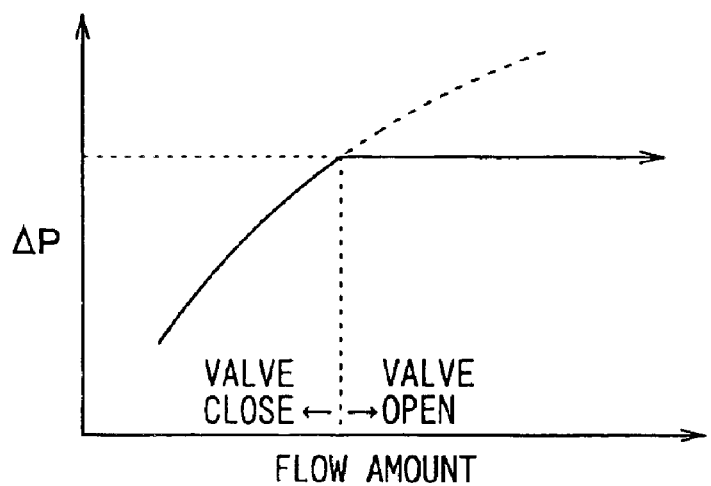
FIG. 4 is a graph showing a relationship between a pressure difference ΔP due to the differential pressure regulating valve and a flow amount of low-pressure refrigerant, according to the first embodiment.

The bypass circuit 62 is provided in parallel, with respect to the throttle portion 61. Therefore, the pressure loss generated in the throttle portion 61 is affected by the operation state of the differential pressure regulating valve 63. Specifically, as shown in FIG. 4, before the differential pressure regulating valve 63 is opened, the pressure loss (i.e., the pressure difference ΔP) in the throttle portion 61 is increased as the refrigerant flow amount passing through the throttle portion 61 increases. That is, before the differential pressure regulating valve 63 is opened, the pressure loss is increased as the pumping capacity of the ejector 40, due to an increase of an adiabatic heat drop in the nozzle 41, increases. After the differential pressure regulating valve 63 is opened, the pressure loss nearly becomes constant.

Thus, before the differential pressure regulating valve 63 is opened, the pressure increasing amount in the ejector 40 is changed in accordance with a change of the adiabatic heat drop in the nozzle 41. After the differential pressure regulating valve 63 is opened, the pressure increasing amount in the ejector 40 becomes nearly constant.

In this embodiment, as shown in FIG. 1, the throttle portion 61, the bypass passage 62 and the differential pressure regulating valve 63 construct a pressure-increasing amount control device which decompresses the refrigerant supplied from the gas-liquid separator 50 to the evaporator 30 while controlling the pressure increasing amount in the ejector 40. Before the differential pressure regulating valve 63 is opened, the pressure increasing amount in the pressure increasing portion of the ejector 40 is determined based on the pressure loss in the throttle portion 61. That is, before the differential pressure regulating valve 63 is opened, the refrigerant flow amount circulated in the evaporator 30 and the pressure in the evaporator 30 are determined by the pressure loss in the throttle portion 61.

In a case where the compressor 10 operates, when the decompression amount in the throttle portion 61 becomes larger, that is, when the pressure loss (i.e., pressure difference ΔP) in the throttle portion 61 becomes larger, a suction flow amount of the refrigerant drawn from the evaporator 30 into the pressure increasing portion of the ejector 40 becomes smaller. In contrast, when the decompression amount in the throttle portion 61 becomes smaller, that is, when the pressure loss in the throttle portion 61 becomes smaller, the suction flow amount of the refrigerant drawn from the evaporator 30 into the pressure increasing portion becomes larger.

Here, when the decompression amount in the throttle portion 61 becomes larger, the pressure in the evaporator 30 is decreased, an evaporation temperature is decreased, and a refrigerant flow amount in the evaporator 30 is decreased. In this case, a super-heating degree of refrigerant at a refrigerant outlet of the evaporator 30 becomes excessively large, and heat-exchanging efficiency in the evaporator 30 is decreased. Therefore, cooling capacity in the evaporator 30 is decreased, and coefficient of performance in the ejector cycle may be deteriorated. In contrast, when the decompression amount in the throttle portion 61 becomes small, the pressure increasing amount in the pressure increasing portion of the ejector 40 is reduced, and the pressure of refrigerant to be sucked into the compressor 10 is reduced. In this case, compression work amount (compression operation amount) of the compressor 10 is increased, and the coefficient of performance in the ejector cycle may be decreased.

Accordingly, in the first embodiment, the throttle opening degree of the throttle opening 61 is set so that the coefficient of performance is not deteriorated in the ejector cycle in a variable range of the air-conditioning load. Further, in the first embodiment, the throttle opening degree of the nozzle 41 is controlled so that a refrigerant pressure at the outlet side of the radiator 20 becomes a target pressure determined based on the refrigerant temperature at the outlet side of the radiator 20, and the flow amount of refrigerant discharged from the compressor 10 is controlled so that the evaporation temperature (e.g., air temperature immediately after passing through the evaporator 30) in the evaporator 30 becomes a target temperature. Here, the target pressure is a high-pressure side refrigerant pressure which is determined based on the high-pressure side refrigerant temperature so that a high coefficient of performance can be obtained in the ejector cycle. Further, the target temperature in the evaporator 30 is a low temperature where the evaporator 30 is not frosted. For example, the target temperature in the evaporator 30 is an air temperature immediately after passing through the evaporator 30, e.g., 3–4° C.

According to the first embodiment of the present invention, the pressure increasing amount in the pressure increasing portion of the ejector 40 is controlled to be lower than a pressure difference. Therefore, it can restrict the pressure of refrigerant to be sucked into the compressor 10 from being excessively increased due to an excessive increase of the pressure increasing amount in the pressure increasing portion of the ejector 40. Thus, it can prevent the radiating capacity of the radiator 20 from being decreased in a high outside air temperature. As a result, a sufficient cooling capacity can be always obtained.

Further, in the first embodiment, a valve-opening pressure difference ΔP of the differential pressure regulating valve 63 is set in a range between 0.6 MPa and 0.7 MPa, and the pressure increasing amount in the pressure increasing portion of the ejector 40 is set to be equal to or lower than the valve-opening pressure difference of the differential pressure regulating valve 63. Thus, when carbon dioxide is used as the refrigerant in the ejector cycle, the maximum pressure increasing amount in the ejector 40 can be set equal to or higher than 1.2 MPa while the evaporation temperature of the evaporator 30 can be maintained at a low temperature where the frost is not caused in the evaporator 30.

(Second Embodiment)

Figure 5:
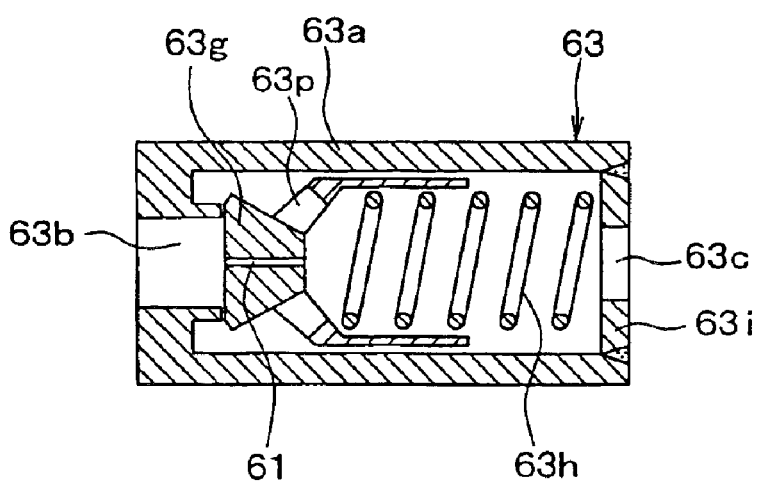
FIG. 5 is a schematic sectional view showing a differential pressure regulating valve according to a second embodiment of the present invention.

The second embodiment of the present invention will be now described with reference to FIG. 5. In the second embodiment, as shown in FIG. 5, a throttle portion 61 is provided in the valve body 63g of the differential pressure regulating valve 63, so that the throttle portion 61, the bypass passage 62 and the differential pressure valve 63 are integrated to construct the pressure-increasing control device 60.

Thus, in the second embodiment, when the differential pressure regulating valve 63 is closed, refrigerant flows through the pressure-increasing control device 60 through the throttle portion 61 provided in the valve body 63g. In contrast, when the differential pressure regulating valve 63 is opened, refrigerant mainly flows through the pressure-increasing control device 60 through the valve port 63f of the housing 63a.

In the second embodiment, the other parts are similar to those of the above-described first embodiment, and the advantages described in the first embodiment can be obtained.

(Third Embodiment)

Figure 6:
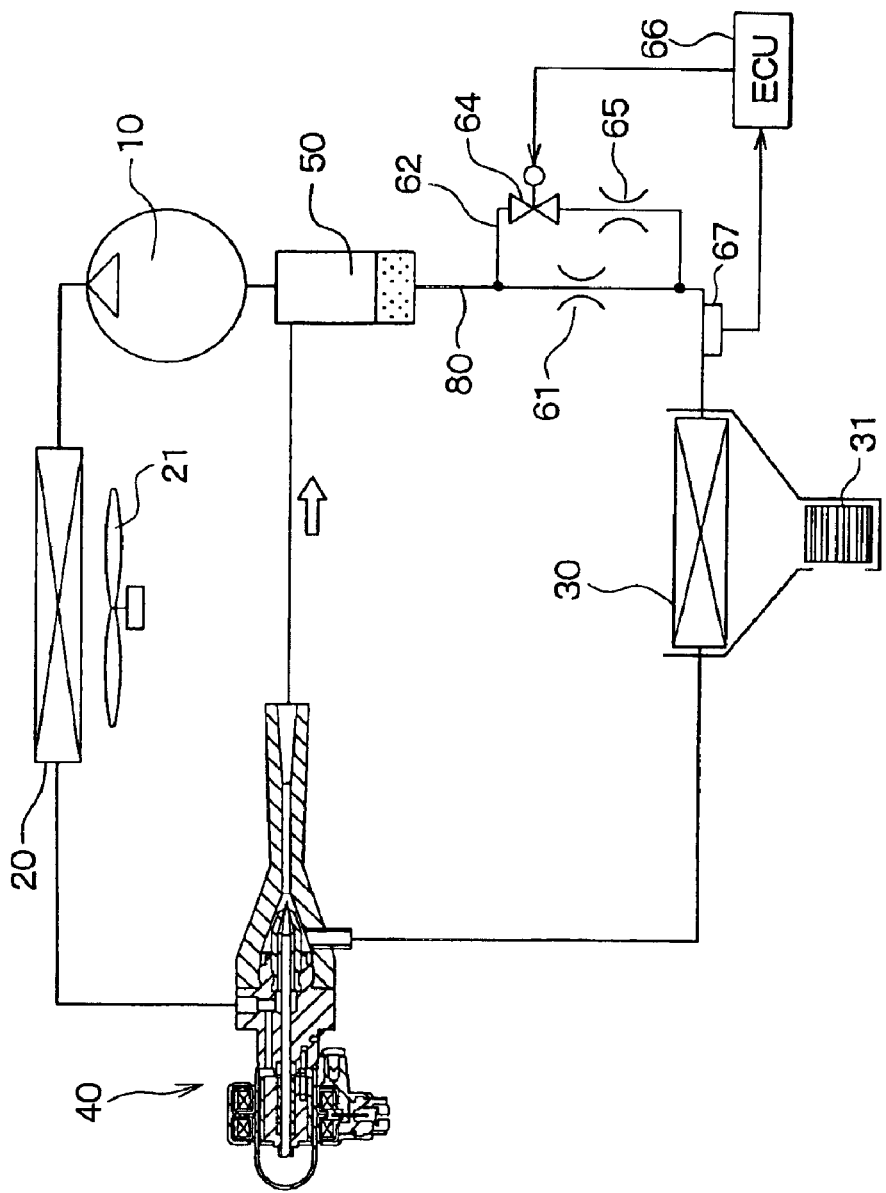
FIG. 6 is a schematic diagram showing an ejector cycle (vapor-compression refrigerant cycle) according to a third embodiment of the present invention.

The third embodiment of the present invention will be now described with reference to FIGS. 6–8. In the third embodiment, as shown in FIG. 6, a solenoid valve 64 for opening and closing the bypass passage 62, and a throttle portion 65 is provided in the bypass passage 62 in series with the solenoid valve 64. Further, an electronic control unit 66 is provided to control an opening or a closing of the solenoid valve 64. In the third embodiment, a pressure-increasing control means similar to the differential pressure control valve 63 described in the first embodiment is constructed with the solenoid valve 64, the throttle portion 65 and the electronic control unit 66.

The throttle portion 65 is a fixed throttle which generate a pressure difference when the solenoid valve 64 is opened so that the pressure increasing amount in the pressure increasing portion of the ejector 40 can be controlled to be lower than the predetermined amount. The electronic control unit 66 controls the opening and closing operation of the solenoid valve 64 based on the thermal load (air-conditioning load) in the evaporator 30.

For example, when the thermal load in the evaporator 30 is high, a large amount of high-temperature air passes through the evaporator 30. In this case, the pressure and the temperature in the evaporator 30 becomes higher. In the third embodiment, a refrigerant temperature Tin flowing into the evaporator 30 is detected by using a temperature sensor 67, so that the thermal load of the evaporator 30 is detected.

Figure 7:
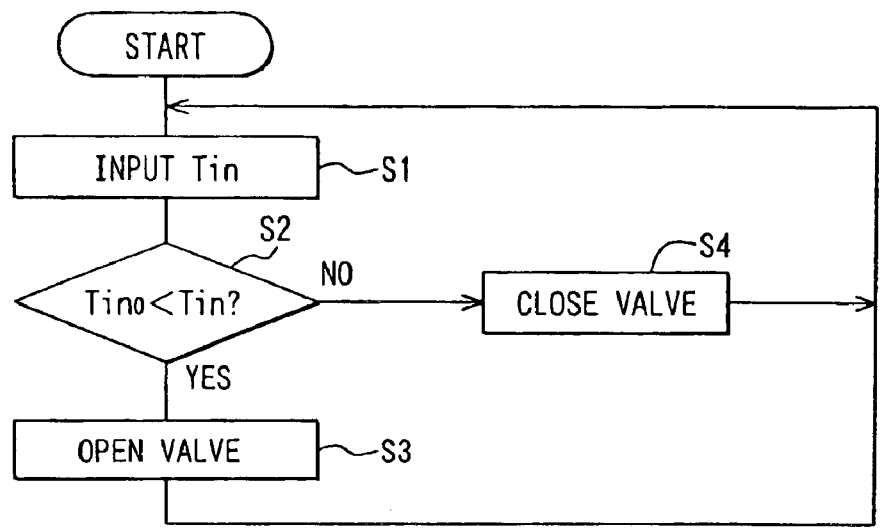
FIG. 7 is a flow diagram showing a control operation of the ejector cycle according to the third embodiment.
Figure 8:
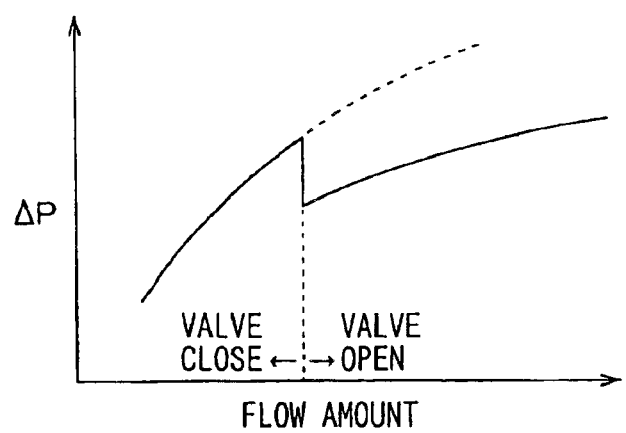
FIG. 8 is a graph showing a relationship between a pressure difference ΔP due to the differential pressure regulating valve and a flow amount of low-pressure refrigerant, according to the third embodiment.

As shown in FIG. 7, at step S1, the refrigerant temperature Tin detected by the temperature sensor 67 is input into the electronic control unit 66. When the refrigerant temperature Tin detected by the temperature sensor 67 is higher than a predetermined temperature Tin0 at step S2, it is determined that the evaporator 30 is in a high load condition and the pressure increasing amount in the pressure increasing portion of the ejector 40 is larger than a predetermined amount. In this case, at step S3, the solenoid valve 64 is opened, and a pressure reducing amount generated between the gas-liquid separator 50 and the evaporator 30 is decreased. That is, in this case, the pressure increasing amount in the pressure increasing portion of the ejector 40 is decreased. In contrast, when the detection temperature Tin of the temperature sensor 67 is equal to or lower than the predetermined temperature Tin0 at step S2, the solenoid valve 64 is closed at step S4.

Thus, the pressure increasing amount in the pressure increasing portion of the ejector 40 can be controlled to be equal to or lower than a predetermined amount. Thus, it can restrict the pressure of refrigerant to be sucked into the compressor 10 from being excessively increased due to the increase of the pressure increasing amount in the pressure increasing portion of the ejector 40. Thus, it can prevent the heat radiating capacity of the radiator 20 from being decreased, and sufficient cooling capacity can be always obtained in the ejector cycle.

According to the third embodiment, the pressure increasing amount in the pressure increasing portion of the ejector 40 can be simply controlled by controlling the opening and closing operation of the solenoid valve 64. Therefore, the ejector cycle can be manufactured in low cost. In the third embodiment, the thermal load of the evaporator 30 can be determined by using a refrigerant pressure, in accordance with a relationship between the refrigerant temperature and the refrigerant pressure in the evaporator 30.

(Fourth Embodiment)

The fourth embodiment of the present invention will be now described with reference to FIGS. 9 and 10. In the fourth embodiment, the pressure-increasing amount control device 60 is constructed with an electrical variable throttle 68 in which a throttle opening degree can be changed.

Figure 9:
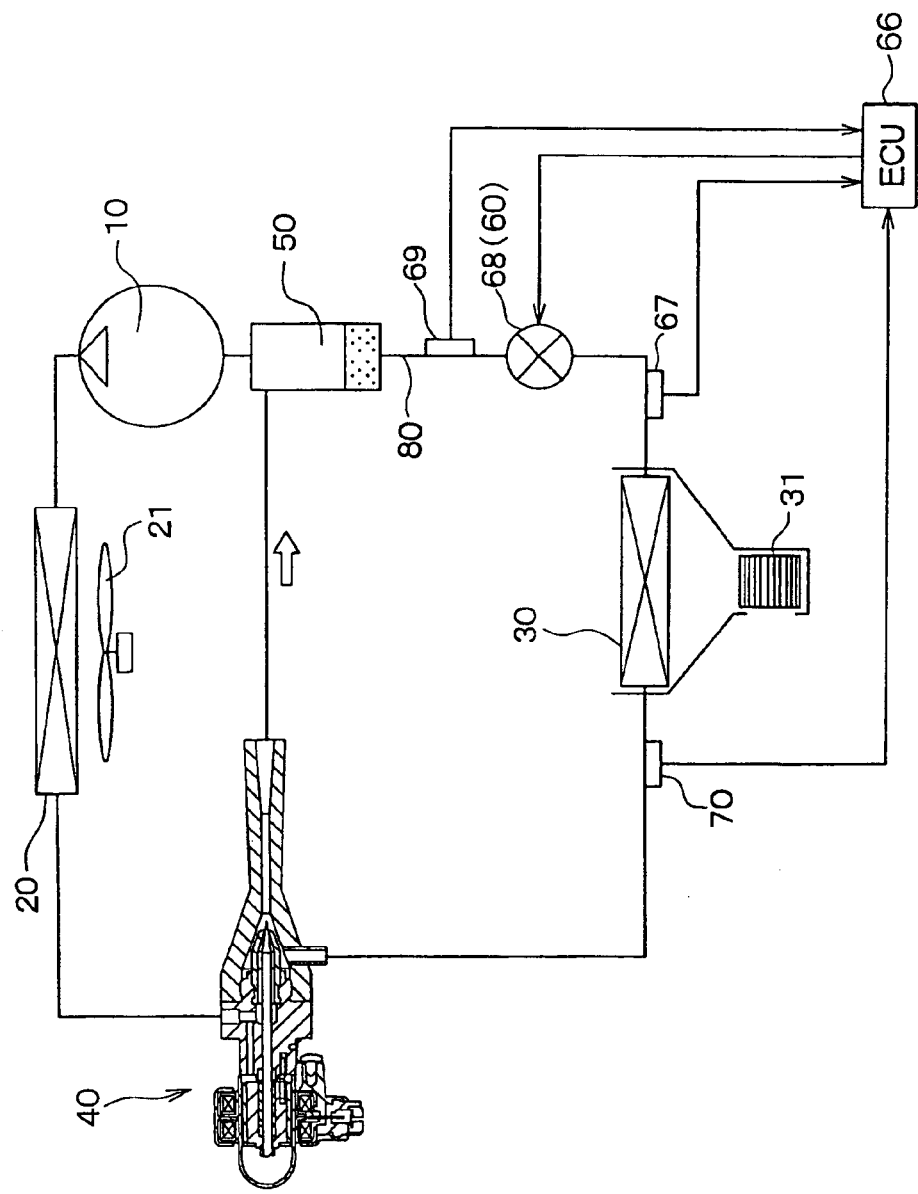
FIG. 9 is a schematic diagram showing an ejector cycle (vapor-compression refrigerant cycle) according to a fourth embodiment of the present invention.

Specifically, as shown in FIG. 9, the throttle portion 61 and the bypass passage 62 and the differential pressure regulating valve 63 described in the first embodiment are omitted. In the fourth embodiment, the electrical variable throttle 68 is provided in the refrigerant passage 80 between the gas-liquid separator 50 and the evaporator 30, and a pressure different before and after the variable throttle 68 is determined based on refrigerant temperature difference before and after the variable throttle 68, and the throttle opening degree of the variable throttle 68 is adjusted based on the temperature difference (pressure difference) before and after the variable throttle 68.

A temperature sensor 69 is disposed in the refrigerant passage 80 between the gas-liquid separator 50 and the evaporator 30 to detect a refrigerant temperature Tin before being decompressed in the variable throttle 68, and a temperature sensor 67 is disposed in the refrigerant passage 80 between the gas-liquid separator 50 and the evaporator 30 to detect a refrigerant temperature Tout after being decompressed in the variable throttle 68. A temperature difference between the detection temperatures Tin, Tout of the temperature sensors 69, 67 are input to the electronic control unit 66, and a pressure reducing amount (decompression amount) in the variable throttle 68 is controlled by the electronic control unit 66. Then, the throttle opening degree of the variable throttle 68 is controlled based on a pressure difference (refrigerant temperature) between the refrigerant inlet and the refrigerant outlet of the variable throttle 68 in accordance with a pre-set control program.

Generally, the refrigerant flowing out of the gas-liquid separator 50 toward the variable throttle 68 is a saturation liquid refrigerant, and the refrigerant flowing into the evaporator 30 is a gas-liquid two-phase refrigerant in the refrigerant pressure of the evaporator 30. Further, the refrigerant temperature Tout after being decompressed in the variable throttle 68 is a saturation temperature in the refrigerant pressure after being decompressed in the variable throttle 68, and the refrigerant temperature Tin before being decompressed in the variable throttle 68 is a saturation temperature in the refrigerant pressure before being decompressed in the variable throttle 68. Thus, the pressure difference $\Delta P$ can be calculated based on the temperature difference (Tout−Tin) between the refrigerant temperature Tout and the refrigerant temperature Tin.

Figure 10:
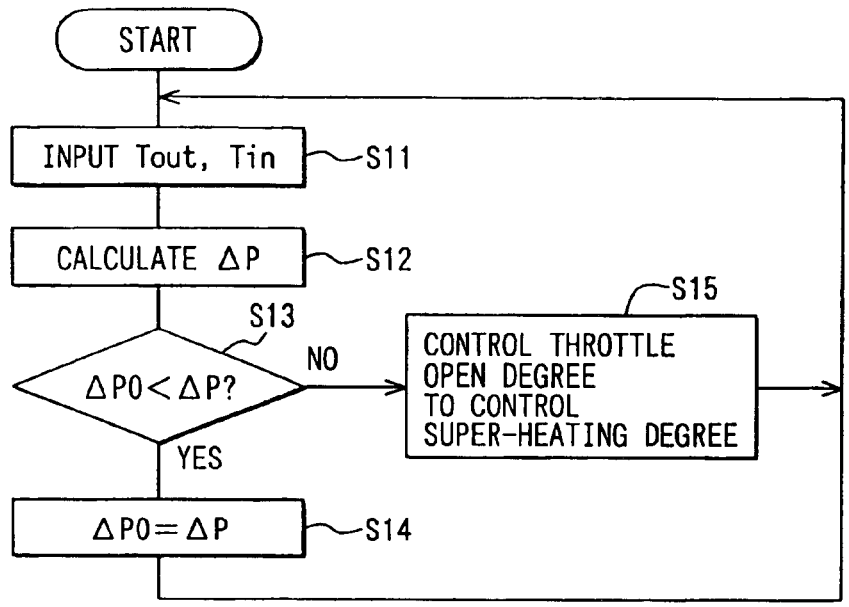
FIG. 10 is a flow diagram showing a control operation of the ejector cycle according to the fourth embodiment.

FIG. 10 shows a control operation of the variable throttle 68 in the ejector cycle according to the fourth embodiment. As shown in FIG. 6, at step S11, the refrigerant temperatures Tout, Tin detected by the temperature sensors 67, 69 are input to the electronic control unit 66. Then, at step S12, the pressure difference $\Delta P$ is calculated based on the temperature difference (Tout−Tin). At step S13, it is determined whether or not the pressure difference $\Delta P$ is larger than a predetermined valve $\Delta P0$. When the pressure difference $\Delta P$ is larger than the predetermined valve $\Delta P0$, the opening degree of the variable throttle 68 is controlled so that the pressure difference $\Delta P$ becomes the predetermined valve $\Delta P0$ (i.e., $\Delta P=\Delta P0$) at step S14. In contrast, when the pressure difference $\Delta P$ is not larger than the predetermined valve $\Delta P0$, the throttle opening degree of the variable throttle 68 is controlled so as to control a super-heating degree at the refrigerant outlet of the evaporator 30 at step A15. That is, at step S15, when the pressure difference $\Delta P$ is not larger than the predetermined valve $\Delta P0$, the throttle opening degree of the variable throttle 68 is controlled so that a high coefficient of performance can be obtained in the ejector cycle.

In the fourth embodiment, by controlling the super-heating degree at the refrigerant outlet of the evaporator 30, that is, by controlling the temperature difference between the refrigerant temperature flowing into the evaporator 30 and the refrigerant temperature flowing out of the evaporator 30 in a predetermined temperature range (e.g., 2–4° C.), the high coefficient of performance can be obtained in the ejector cycle. Here, the refrigerant temperature flowing into the evaporator 30 is detected by the temperature sensor 67, and the refrigerant temperature flowing out of the evaporator 30 is detected by the temperature sensor 70.

In the fourth embodiment, the pressure difference $\Delta P$ is indirectly detected by using the refrigerant temperature difference. However, the pressure difference $\Delta P$ can be directly detected by using pressure sensors.

According to the fourth embodiment, by controlling the pressure reducing amount (pressure difference $\Delta P$) in the variable throttle 68, the pressure-increasing amount in the pressure increasing portion of the ejector 40 can be suitably controlled, so that the heat-radiating amount in the radiator 20 can be increased.

(Fifth Embodiment)

The fifth embodiment of the present invention will be now described with reference to FIG. 11. The fifth embodiment is a modification of the above-described fourth embodiment. In the above-described fourth embodiment, the throttle opening degree of the variable throttle 68 is controlled in accordance with the pressure difference $\Delta P$ before and after the variable throttle 68. In the fifth embodiment, the throttle opening degree of the variable throttle 68 is controlled in accordance with a pressure within the gas-liquid separator 50, that is, a suction pressure of refrigerant to be sucked into the compressor 10. The refrigerant pressure in the gas-liquid separator 50, that is, the pressure of the refrigerant to be sucked into the compressor 10 is related to the refrigerant temperature Tin at the refrigerant inlet side of the variable throttle 68.

Figure 11:
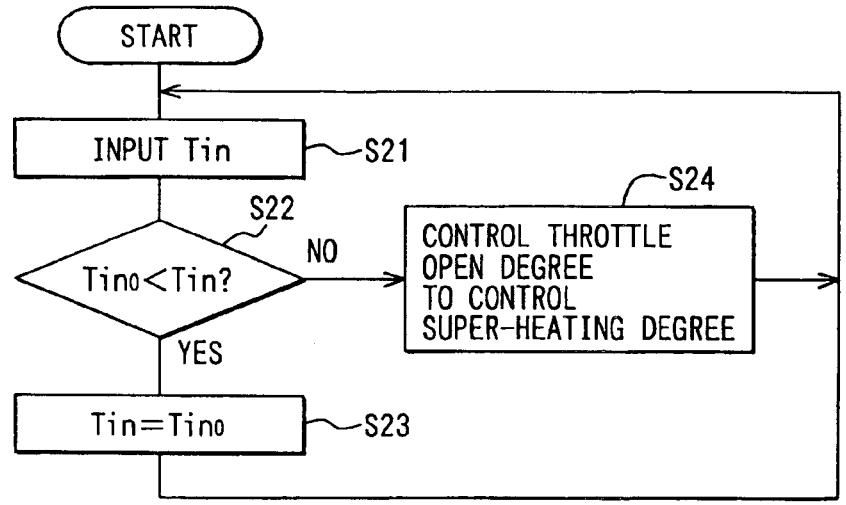
FIG. 11 is a flow diagram showing a control operation of the ejector cycle according to a fifth embodiment of the present invention.

Specifically, as shown in FIG. 11, the refrigerant temperature Tin indicating the suction pressure of the refrigerant to be sucked into the compressor 10 is input at step S21. Next, at step S22, it is determined whether or not the refrigerant temperature Tin before being decompressed in the variable throttle 68 is higher than a predetermined temperature Tin0. When the refrigerant temperature Tin before being decompressed in the variable throttle 68 is higher than a predetermined temperature Tin0, the throttle opening degree of the variable throttle 68 is controlled so that the refrigerant temperature Tin before being decompressed in the variable throttle 68 becomes the predetermined temperature Ti0. In contrast, when the refrigerant temperature Tin before being decompressed in the variable throttle 68 is not higher than the predetermined temperature Tin0, the throttle opening degree of the variable throttle 68 is controlled so that the super-heating degree of refrigerant at the outlet of the evaporator 30 is controlled thereby obtaining the high coefficient of performance in the ejector cycle, at step S24.

In the fifth embodiment, the predetermined temperature Tin0 is a set temperature lower than the critical temperate of the refrigerant. In this embodiment, the super-heating degree of the refrigerant at the refrigerant outlet of the evaporator 30 is controlled in a suitable range, so that the high coefficient of performance can be obtained in the ejector cycle.

In the fifth embodiment, the refrigerant pressure at the refrigerant inlet of the variable throttle 68, that is, the refrigerant pressure in the gas-liquid separator 50 can be directly detected by using a refrigerant pressure sensor.

(Sixth Embodiment)

Figure 12:
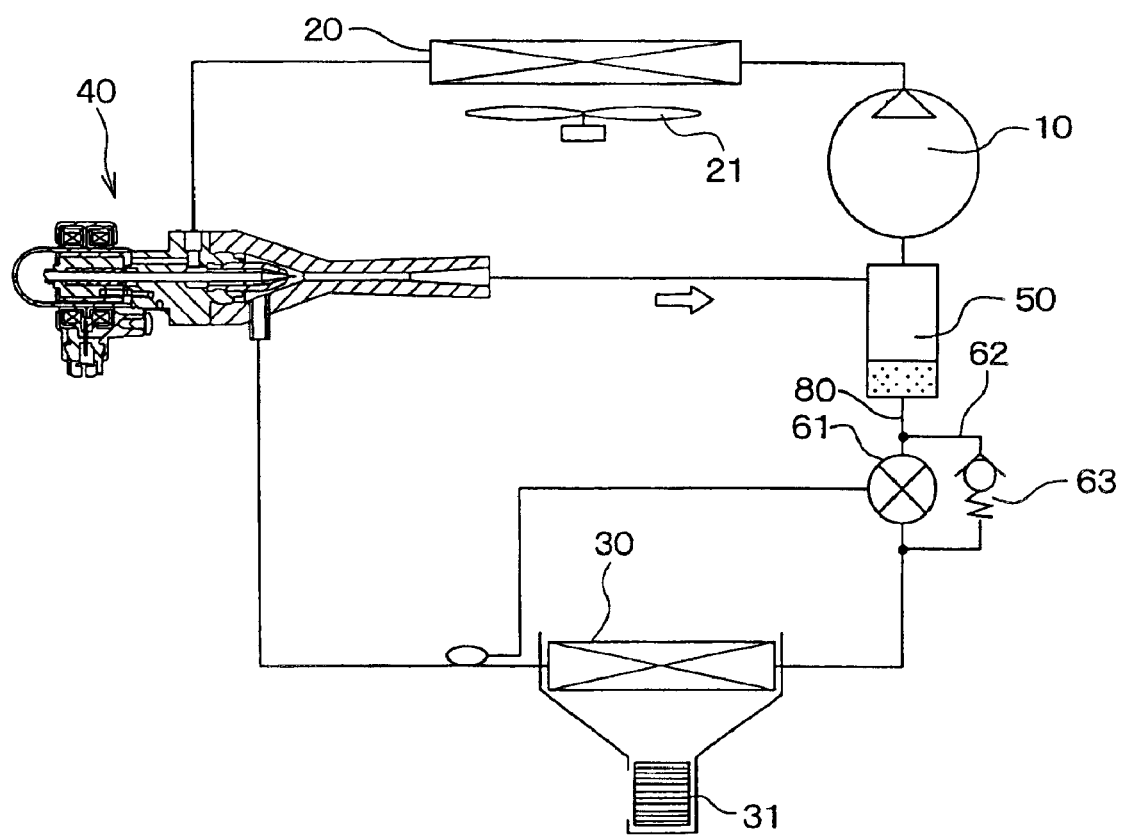
FIG. 12 is a schematic diagram showing an ejector cycle (vapor-compression refrigerant cycle) according to a sixth embodiment of the present invention.
Figure 13:
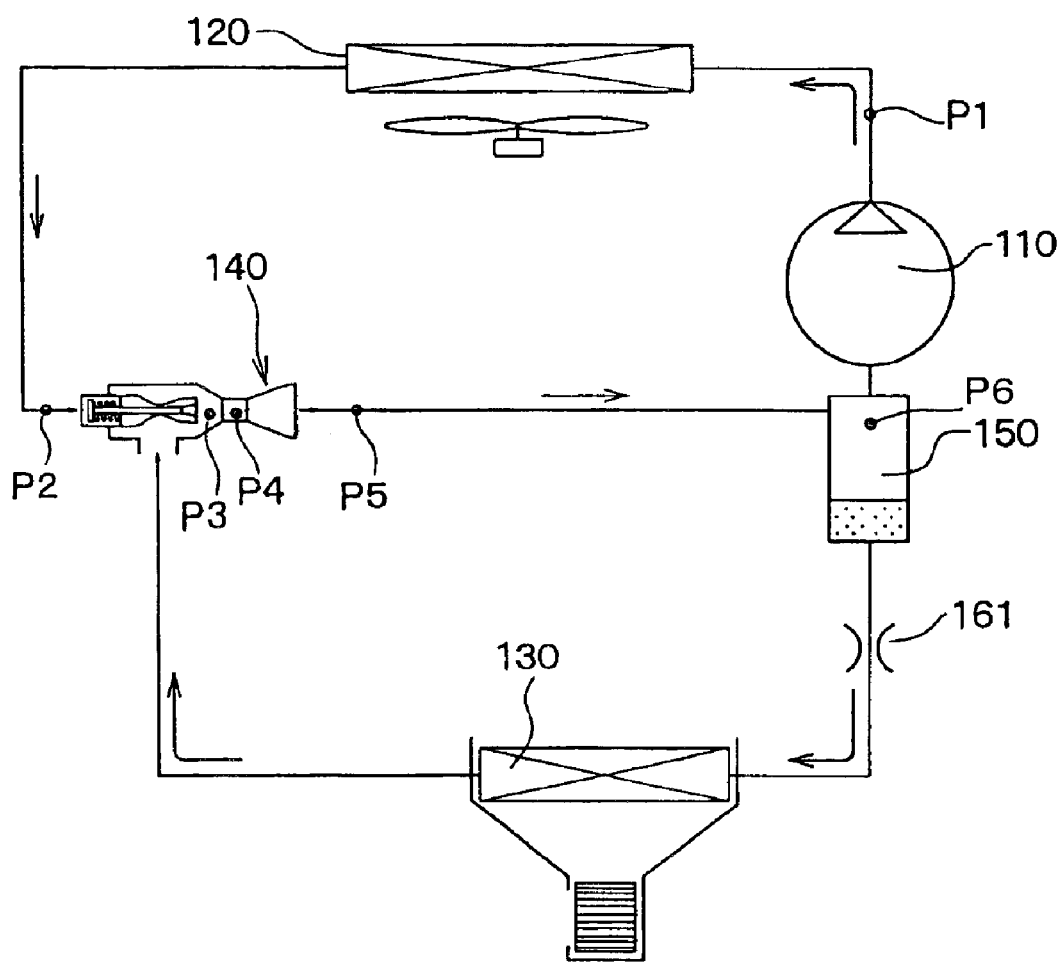
FIG. 13 is a schematic diagram showing an ejector cycle in a related art.
Figure 14:
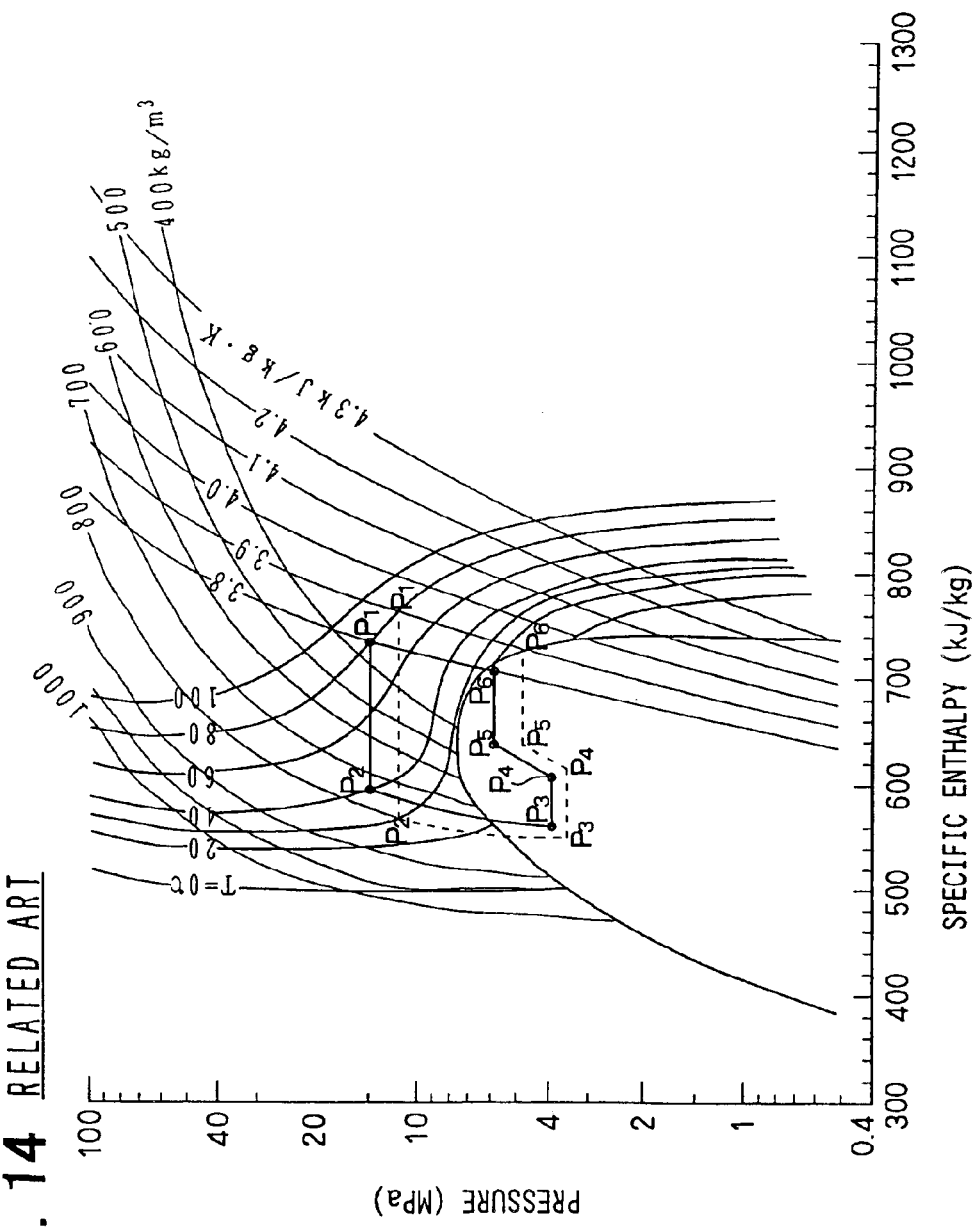
FIG. 14 is a Mollier diagram (p–h diagram) showing a relationship between a refrigerant pressure and a refrigerant specific enthalpy in the ejector cycle of FIG. 13.

The sixth embodiment of the present invention will be now described with reference to FIG. 12. In the sixth embodiment, a thermal expansion valve 61 is used as the throttle portion 61 in the above-described first embodiment. In this case, the throttle opening degree of the thermal expansion valve 61 is controlled so that the super-heating degree of the refrigerant at the refrigerant outlet side of the evaporator 30 becomes a predetermined value. In the sixth embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described embodiments, the pressure reducing amount (decompression amount, pressure difference) in the refrigerant passage 80 from the gas-liquid separator 50 to the evaporator 30 is adjusted so that the pressure increasing amount in the pressure increasing portion 42, 43 of the ejector 40 is controlled. However, the pressure increasing amount in the pressure increasing portion 42, 43 of the ejector 40 can be controlled by changing a passage sectional area in the mixing portion 42 or the diffuser 43 in accordance with the air-conditioning load.

In the above-described embodiments, carbon dioxide is used as the refrigerant, and the pressure of the high-pressure refrigerant discharged from the compressor 10 is set higher than the critical pressure of the refrigerant. In this case, the advantages of the present invention can be effectively improved. However, it is not limited to that, and the pressure of refrigerant discharged from the compressor 10 can be made lower than the critical pressure of the refrigerant. Further, a natural refrigerant such as nitrogen can be used instead of the carbon dioxide.

Further, in the above embodiments, the ejector cycle according to the present invention is typically used for the vehicle air conditioner. However, the ejector cycle of the present invention can be used for a vapor compression refrigerator for the other user.

In the above-described embodiments, the variable compressor is used and the discharge capacity of the compressor 10 is controlled so that the evaporation temperature (i.e., low-pressure side refrigerant temperature) in the evaporator 30 becomes in a predetermined range. However, a fixed compressor can be used as the compressor 10, and the work rate (operation rate) of the compressor 10 can be controlled by using an electromagnetic clutch.

In the above-described embodiments, the throttle opening degree of the nozzle 41 is set to be variably controlled. However, the throttle opening degree of the nozzle 41 can be fixed. That is, the present invention can be applied to an ejector cycle with an ejector having a fixed opening degree of a nozzle.

Further, in the above-described embodiments, the throttle opening degree of the nozzle 41 is adjusted by using the electrical actuator 45. However, a mechanical actuator described in JP-9-264622 can be used as the actuator 45.

Such changes and modifications are to be understood as being within the scope of the present invention as defined by the appended claims.

What is claimed is:

1. A vapor-compression refrigerant cycle comprising:

a compressor for discharging a high-pressure refrigerant;

a high-pressure heat exchanger for radiating heat of the high-pressure refrigerant discharged from the compressor;

a low-pressure heat exchanger in which a low-pressure refrigerant after being decompressed is evaporated;

an ejector including a nozzle for decompressing and expanding the high-pressure refrigerant flowing out of the high-pressure heat exchanger, and a pressure increasing portion in which gas refrigerant evaporated in the low-pressure heat exchanger is drawn by a high-speed flow of refrigerant jetted from-the nozzle and a pressure of refrigerant to be sucked into the compressor is increased by converting expansion energy of the refrigerant to pressure energy thereof;

a gas-liquid separator for separating the refrigerant flowing out of the ejector into gas refrigerant and liquid refrigerant, the gas-liquid separator including a gas refrigerant outlet connected to a refrigerant suction side of the compressor and a liquid refrigerant outlet connected to a refrigerant inlet side of the low-pressure heat exchanger;

a decompression means for decompressing refrigerant supplied from the gas-liquid separator to the low-pressure heat exchanger; and a pressure-increasing amount control means for controlling a pressure increasing amount of refrigerant in the pressure increasing portion of the ejector.

2. The vapor-compression refrigerant cycle according to claim 1, wherein the decompression means is a fixed throttle in a refrigerant passage between the liquid refrigerant outlet of the gas-liquid separator and the refrigerant inlet side of the low-pressure heat exchanger.

3. The vapor-compression refrigerant cycle according to claim 2, wherein the pressure-increasing amount control means controls a decompression amount of refrigerant supplied from the gas-liquid separator to the low-pressure heat exchanger so as to control the pressure increasing amount in the pressure increasing portion of the ejector.

4. The vapor-compression refrigerant cycle according to claim 2, wherein the pressure-increasing amount control means is disposed to control a pressure difference between a refrigerant inlet of the decompression means and a refrigerant outlet of the decompression means so as to control the pressure increasing amount in the pressure increasing portion of the ejector.

5. A vapor-compression refrigerant cycle comprising:

a compressor for discharging a high-pressure refrigerant;

a high-pressure heat exchanger for radiating heat of the high-pressure refrigerant discharged from the compressor;

a low-pressure heat exchanger in which a low-pressure refrigerant after being decompressed is evaporated;

an ejector including a nozzle for decompressing and expanding the high-pressure refrigerant flowing out of the high-pressure heat exchanger, and a pressure increasing portion in which gas refrigerant evaporated in the low-pressure heat exchanger is drawn by a high-speed flow of refrigerant jetted from the nozzle and a pressure of refrigerant to be sucked into the compressor is increased by converting expansion energy of the refrigerant to pressure energy thereof;

a gas-liquid separator for separating the refrigerant flowing out of the ejector into liquid refrigerant and gas refrigerant, the gas-liquid separator including a gas refrigerant outlet connected to a refrigerant suction side of the compressor and a liquid refrigerant outlet connected to a refrigerant inlet side of the low-pressure heat exchanger; and a pressure-increasing amount control device which decompresses refrigerant supplied from the gas-liquid separator to the low-pressure heat exchanger and controls a pressure increase amount of refrigerant in the pressure increasing portion of the ejector.

6. The vapor-compression refrigerant cycle according to claim 5, wherein the pressure-increasing amount control device is disposed in a refrigerant passage between the liquid refrigerant outlet of the gas-liquid separator and the refrigerant inlet side of the low-pressure heat exchanger.

7. The vapor-compression refrigerant cycle according to claim 5, wherein:

the pressure-increasing amount control device includes a throttle portion which decompresses refrigerant supplied from the gas-liquid separator to the low-pressure heat exchanger, a bypass passage through which refrigerant is supplied from the gas-liquid separator to the low-pressure heat exchanger while bypassing the throttle portion, and a valve device which adjusts an open degree of the bypass passage.

8. The vapor-compression refrigerant cycle according to claim 7, wherein the valve device is a differential pressure regulating valve which is opened when a pressure difference before and after the valve device is larger than a predetermined value.

9. The vapor-compression refrigerant cycle according to claim 7, wherein the throttle portion, the bypass passage and the valve device are integrated.

10. The vapor-compression refrigerant cycle according to claim 6, wherein:

the pressure-increasing amount control device includes a differential pressure regulating valve that is opened and closed by a pressure difference before and after the differential pressure regulating valve;

the differential pressure regulating valve includes a valve body, and a housing that has a refrigerant inlet, a refrigerant outlet and a valve port communicating with the refrigerant inlet and the refrigerant outlet; and the valve body is disposed in the housing to open and close the valve port.

11. The vapor-compression refrigerant cycle according to claim 10, wherein:

the pressure-increasing amount control device further includes a throttle portion which decompresses the refrigerant supplied from the gas-liquid separator to the low-pressure heat exchanger; and the differential pressure regulating valve is provided in a bypass passage through which refrigerant from the gas-liquid separator bypasses the throttle portion.

12. The vapor-compression refrigerant cycle according to claim 10, wherein:

the pressure-increasing amount control device further includes a throttle portion which decompresses the refrigerant supplied from the gas-liquid separator to the low-pressure heat exchanger; and the throttle portion is provided in the valve body.

13. The vapor-compression refrigerant cycle according to claim 6, further comprising a refrigerant temperature sensor for detecting a refrigerant temperature flowing into the low-pressure heat exchanger; and an electronic control unit which controls operation of the pressure-increasing amount control device based on the refrigerant temperature detected by the refrigerant temperature sensor.

14. The vapor-compression refrigerant cycle according to claim 13, wherein:

when the refrigerant temperature detected by the refrigerant temperature sensor is higher than a predetermined temperature, the electronic control unit controls the pressure-increasing amount control device to reduce a decompression amount of the refrigerant supplied from the gas-liquid separator to the low-pressure heat exchanger.

15. The vapor-compression refrigerant cycle according to claim 6, further comprising an electronic control unit which controls the pressure-increasing amount control device to control a decompression amount of the refrigerant supplied from the gas-liquid separator to the low-pressure heat exchanger, wherein:

when a temperature of the refrigerant from the gas-liquid separator before being decompressed by the pressure-increasing amount control device is higher than a predetermined temperature, the electronic control unit controls the decompression amount of the pressure-increasing amount control device such that the temperature of the refrigerant from the gas-liquid separator becomes equal to or lower than the predetermined temperature; and when the temperature of the refrigerant from the gas-liquid separator before being decompressed by the pressure-increasing amount control device is lower than the predetermined temperature, the electronic control device controls the decompression amount of the pressure-increasing amount control device such that a super-heating degree of refrigerant at a refrigerant outlet of the low-pressure heat exchanger becomes in a predetermined range.

* * * * *